United States Patent
Rutledge et al.

(10) Patent No.: US 6,650,998 B1
(45) Date of Patent: *Nov. 18, 2003

(54) INFORMATION SEARCH SYSTEM FOR ENABLING A USER OF A USER TERMINAL TO SEARCH A DATA SOURCE

(75) Inventors: Charles Wayne Rutledge, Whitehouse Station, NJ (US); Norman Ashton Whitaker, Jr., Atlantic Highlands, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,249

(22) Filed: Jul. 28, 1997

Related U.S. Application Data (63) Continuation-in-part of application No. 08/824,106, filed on Mar. 25, 1997, which is a continuation-in-part of application No. 08/613,307, filed on Mar. 11, 1996, now abandoned.

(51) Int. Cl.[7] ............................................. G06F 17/30
(52) U.S. Cl. ............................ 701/211; 701/213; 707/3
(58) Field of Search .................. 707/1, 5, 10, 100–104, 707/200–206; 434/112, 116; 455/12.1, 406, 412, 434, 456, 457, 466; 701/211; 370/352; 358/442

(56) References Cited

U.S. PATENT DOCUMENTS

| | | |
|---|---|---|
| 4,811,244 A | 3/1989 | Shimada et al. ............. 345/443 |
| 4,850,007 A | 7/1989 | Marino et al. .............. 379/88.2 |
| 5,109,399 A | 4/1992 | Thompson .................... 379/45 |
| 5,124,915 A | 6/1992 | Krenzel ......................... 702/5 |
| 5,193,185 A | 3/1993 | Lanter ........................ 707/101 |
| 5,315,636 A | 5/1994 | Patel .......................... 455/461 |

(List continued on next page.)

FOREIGN PATENT DOCUMENTS

EP      0574138 A1    12/1993    ............ H04N/7/15

OTHER PUBLICATIONS

N.S., "My Yahoo? News Ticker", PC Magazine, Feb., 18, 1997, v16, n4, p. 143.
D.L., "NETdelivery", PC Magazine, Feb., 18, 1997, v16, n4, p. 143.
Mace, T., "The PointCast Network", PC Magazine, Feb. 18, 1997, v16, n4, p. 143.

(List continued on next page.)

Primary Examiner—Ella Colbert
(74) Attorney, Agent, or Firm—Morgan & Finnegan, L.L.P.

(57) ABSTRACT

A network-based search system in which queries and information records are qualified by temporal and geographical references, such as those provided by a map-based directory system. Briefly, queries are submitted using text strings together with time tags and location tags. Time tags and location tags refer to the date/time the query was last submitted for a search and the geographical area of interest (defined by ranges of latitude and longitude coordinates), respectively. The information records being searched preferably contain similar time and location tags. However, time and location tags associated with information records refer to the date/time the record was last modified and the origin of the record, respectively. A mechanism is also provided for determining location tags for records that do not include location tags. In all, a comparison between the time and location tags associated with a query and the time and location tags associated with the information records permits geographically irrelevant records to be suppressed and allows the user to automatically receive only information that has been modified since the user last requested it. Thus, search results are automatically pre-filtered prior to being transmitted to the user who originated the query, which conserves network resources and reduces the amount of context-based filtering required of the user.

2 Claims, 9 Drawing Sheets

U.S. PATENT DOCUMENTS

| | | | | |
|---|---|---|---|---|
| 5,325,423 A | | 6/1994 | Lewis | 379/93.08 |
| 5,392,223 A | | 2/1995 | Caci | 709/218 |
| 5,393,964 A | | 2/1995 | Hamilton et al. | 235/381 |
| 5,414,462 A | | 5/1995 | Veatch | 348/135 |
| 5,426,780 A | | 6/1995 | Gerull et al. | 707/3 |
| 5,428,608 A | | 6/1995 | Freeman et al. | 370/261 |
| 5,452,353 A | | 9/1995 | Menezes | 379/355 |
| 5,463,671 A | | 10/1995 | Marsh et al. | 379/56.1 |
| 5,470,233 A | * | 11/1995 | Fruchterman et al. | 434/112 |
| 5,475,802 A | | 12/1995 | Wescott et al. | 345/429 |
| 5,481,590 A | | 1/1996 | Grimes | 340/7.21 |
| 5,515,424 A | | 5/1996 | Kenney | 379/93.22 |
| 5,530,851 A | * | 6/1996 | Fortier | 707/2 |
| 5,537,324 A | | 7/1996 | Nimura et al. | 701/208 |
| 5,559,707 A | | 9/1996 | DeLorme et al. | 701/200 |
| 5,602,903 A | * | 2/1997 | LeBlanc et al. | 455/456 |
| 5,682,525 A | | 10/1997 | Bouve et al. | 707/104 |
| 5,701,469 A | * | 12/1997 | Brandli et al. | 707/102 |
| 5,727,057 A | | 3/1998 | Emery et al. | 379/211 |
| 5,737,533 A | | 4/1998 | De Hond | 709/219 |
| 5,740,549 A | | 4/1998 | Reilly et al. | 705/14 |
| 5,764,736 A | | 6/1998 | Shachar et al. | 379/93.09 |
| 5,764,906 A | * | 6/1998 | Edelstein et al. | 709/219 |
| 5,771,280 A | | 6/1998 | Johnson | 379/93.23 |
| 5,790,121 A | | 8/1998 | Sklar et al. | 345/356 |
| 5,844,597 A | | 12/1998 | Kettler et al. | 348/14.08 |
| 5,852,810 A | * | 12/1998 | Sotiroff et al. | 705/27 |
| 5,855,015 A | * | 12/1998 | Shoham | 707/5 |
| 5,867,494 A | * | 2/1999 | Krishnaswamy et al. | 370/352 |
| 5,893,093 A | * | 4/1999 | Wills | 707/5 |
| 5,914,951 A | | 6/1999 | Bentley et al. | 370/352 |
| 5,919,247 A | | 7/1999 | Van Hoff et al. | 709/217 |
| 5,930,474 A | | 7/1999 | Dunworth et al. | 709/217 |
| 5,835,236 A | * | 8/1999 | Barbari | 358/442 |
| 5,938,721 A | * | 8/1999 | Dussell et al. | 701/211 |
| 5,944,768 A | * | 8/1999 | Ito et al. | 340/990 |
| 5,944,769 A | | 8/1999 | Musk et al. | 701/201 |
| 5,990,886 A | | 11/1999 | Serdy et al. | 345/329 |
| 5,999,525 A | * | 12/1999 | Krishnaswamy et al. | 370/352 |
| 6,044,205 A | * | 3/2000 | Reed et al. | 709/201 |
| 6,067,500 A | * | 5/2000 | Morimoto et al. | 340/988 |
| 6,138,162 A | | 10/2000 | Pistriotto et al. | 709/229 |

OTHER PUBLICATIONS

Loshin, P., "Tune In, Turn On the Web", BYTE, Feb. 1997, v22, n2, p. 145–6.

* cited by examiner

FIG. 4D zoom

- 24 ○ Countries
- 23 ○
- 22 ○
- 21 ○
- 20 ○ States
- 19 ○
- 18 ○
- 17 ○
- 16 ○
- 15 ○ Counties
- 14 ○
- 13 ●
- 12 ○
- 11 ○ Cities
- 10 ○
- 9 ○
- 8 ○
- 7 ○ Streets
- 6 ○
- 5 ○
- 4 ○
- 3 ○ Buildings
- 2 ○
- 1 ○
- 0 ○

[ Cancel ]
[ Previous ]
[ Zoom ]

| File | Edit | View | Search | Connect | Hotlist | Settings |

- Directory Search...
- Web Search...
- Ad Search...
- Current Searches...

Web Search

Search Terms: [              ]   [Enter Request]

☐ Auto - fetch

Geographical Area ?

○ Unrestricted
● [20] mile radius around HOME
○ Current View

How long should the request stay in place ?

☐ Just this once
☐ One Day
☐ One Week
☐ One Month

Update every [2]   ○ Minutes
              ○ Hours
              ● Days

[Done]
[Cancel]

| PLACE NAME | STATE | COUNTRY | minlat | maxlat | minlong | maxlong |
|---|---|---|---|---|---|---|
| MONMOUTH | NJ | US | 74.623 | 75.170 | 52.531 | 52.977 |
| MONTANA | MT | US | 77.114 | 77.870 | 87.003 | 90.071 |
| SMALLVILLE | UT | US | 71.546 | 71.570 | 78.542 | 78.562 |
| ⋮ | ⋮ | ⋮ | ETC. | ⋮ | ⋮ | ⋮ |
| | | | ⋮ | | | |
| | | | | | | |
| | | | | | | |
| | | | | | | |

INFORMATION SEARCH SYSTEM FOR ENABLING A USER OF A USER TERMINAL TO SEARCH A DATA SOURCE

CROSS-REFERENCE TO RELATED APPLICATIONS

This application is a continuation-in-part of application Ser. No. 08/824,106, filed, Mar. 25, 1997, which is a continuation-in-part of application Ser. No. 08/613,307, filed, Mar. 11, 1996, now abandoned, both of which are incorporated herein by reference.

FIELD OF THE INVENTION

This invention relates generally to an information search system and, more specifically, to a network based information search system in which information queries and records are qualified by time and/or geographical references

BACKGROUND OF THE INVENTION

It has become routine for a user of a personal computer to search a large distributed data source, such as the internet, for information relevant to a topic of interest. With the aid of a browser such as Netscape and a search engine such as Alta Vista, Lycos or Yahoo, the user can perform text string searches for the desired information. Although text string searches provide users with the ability to customize each search, text string searches of large distributed databases often produce thousands of hits, many of which are irrelevant to the user's topic of interest. As one can imagine, subsequent filtering of the search results by the user is a tedious and time consuming process. Furthermore, a user who repeats a search to obtain the most up-to-date information must compare the search results against information from earlier searches to filter the updates, thereby adding to the user's burden.

Alternatively, a user may subscribe to an on-line magazine or newsgroup, which are known in the art as information "push" systems, to receive globally broadcast information of interest without having to transmit a search request. The user can "tune" to one of a limited number of channels to obtain the information of interest. However, the user is limited to the broad classification of the channel to which he is tuned (e.g., "Sports News/NFL") and thus, unlike with text string searching, cannot truly customize his subscription.

As such, there is currently no way for a user to perform text string searches of a data source in a manner that significantly increases the percentage of relevant "hits" and thus decreases the amount of time spent by a user filtering search results.

SUMMARY OF THE INVENTION

A technical advance is achieved in the art by providing a method and system for a geographical information search system.

A system and method are disclosed for searching a data source using text string searches in which queries and information records are qualified by temporal and/or geographical references. In an exemplary embodiment, temporal and geographical references associated with a query are the date/time the query was last submitted by a user and the user's geographical area of interest (defined by ranges of latitude and longitude coordinates), respectively. The temporal and geographical references associated with an information record are the date/time the record was last modified and the "origin" of the record, respectively. A comparison between the temporal and geographic references associated with a query and those associated with the information records in the data source permits geographically irrelevant records to be suppressed and allows an individual user to receive only information that has been modified since the user last requested it. Thus, search results are automatically pre-filtered prior to transmission to the user thereby conserving network resources and reducing the amount of context-based filtering required of the user.

Other and further aspects of the present invention will become apparent during the course of the following detailed description and by reference to the attached drawings.

BRIEF DESCRIPTION OF THE DRAWINGS

The subject matter regarded as the invention is particularly pointed out and distinctly claimed in the concluding portion of the specification. The invention, however, both as to organization and method of operation, together with advantages thereof may be best understood by reference to the following detailed description when read with the accompanying drawings in which:

DETAILED DESCRIPTION

Figure 1:
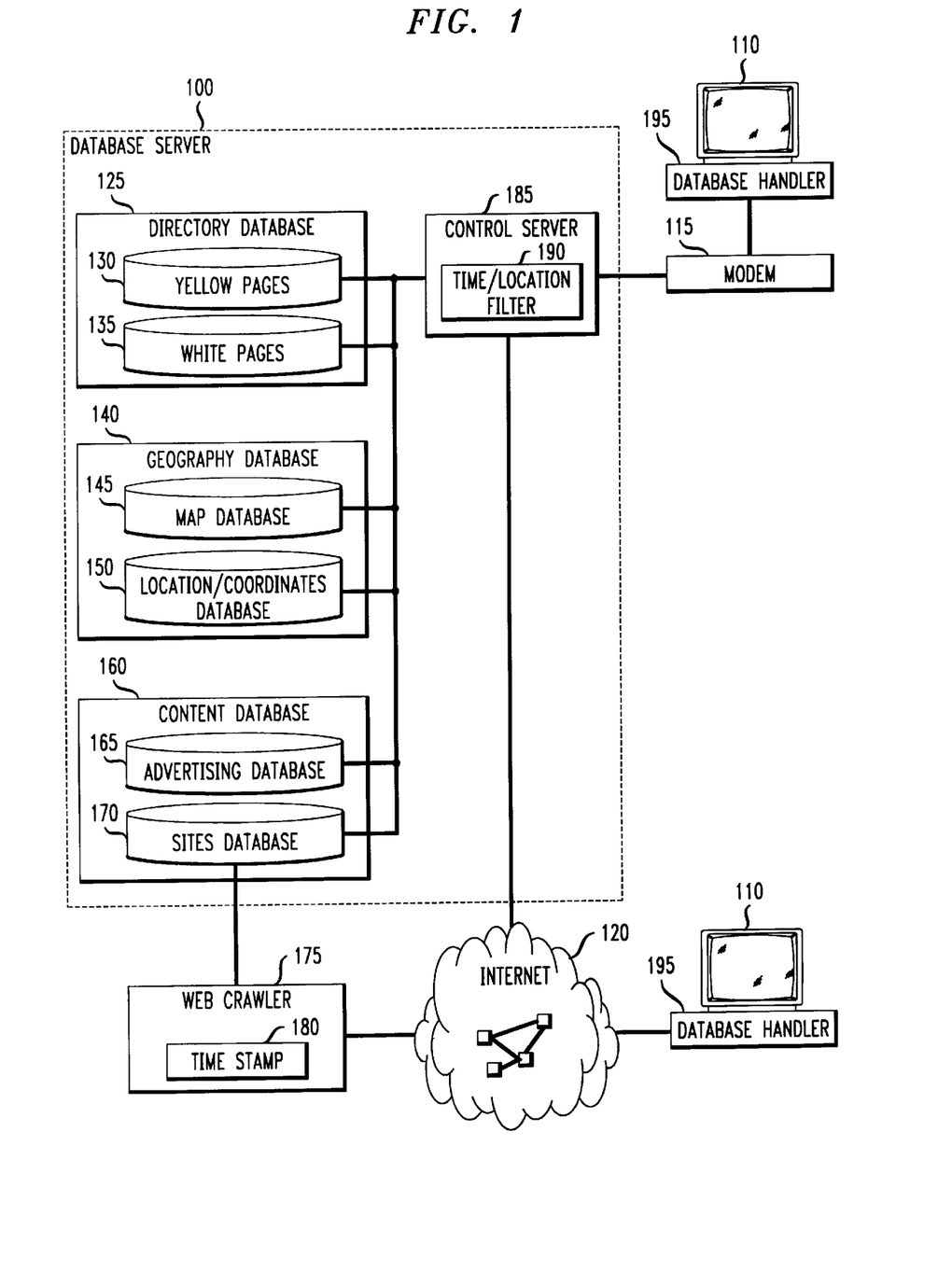
FIG. 1 illustrates a block diagram of a communications network that employs an embodiment of a geographical information search system in accordance with the present invention.

FIG. 1 illustrates a block diagram of a communications network that advantageously employs an embodiment of a geographical information search system in accordance with the present invention. As shown in FIG. 1, a plurality of user terminals 110 such as personal computers are configured to access a database server 100. A user can access the database server 100 via either a modem 115 or a computer communications network such as the internet 120.

Database server 100 includes a directory database 125, which preferably stores yellow pages (i.e., business) and white pages (i.e., residential) listings (130, 135). Each listing may include name, telephone number and other relevant information. The database server 100 also includes a geography database 140, which comprises two components: a map database 145 and a location/coordinates database 150. The map database 145 stores geographic regions categorized into map tiles and zoom layers as will be discussed in detail hereinafter. The location/coordinates database 150 stores information correlating "place names" (e.g., Monmouth, N.J.) to a range of location coordinates defined in terms of latitude and longitude, as will be discussed in detail hereinafter.

In addition, database server 100 includes a content database 160, which, like the geography database 140, also comprises two components: an advertising database 165 and a sites database 170. The advertising database 165 stores advertising information preferably relating to entities having listings in the directory database 125. The sites database 170 stores web sites (e.g., URLs), each referenced by a text string that describes the contents of the site. The sites database 170 is populated autonomously by a network agent such as a web crawler 175. The web crawler 175 searches for sites by following hypertext links over the a computer communications network such as the internet. Upon finding a site, the web crawler 175 adds the site to the sites database 170 together with a time stamp 180. The time stamp indicates the date and time that the site was added to the database. Upon revisiting a site, the web crawler 175 will determine if the site has been modified since it was first found and, if it has been, the web crawler 175 will update the corresponding time stamp accordingly.

A control server 185 manages and supervises the activities of the database server 100. Control server 185 is coupled to the directory database 125, the map database 145, the location/coordinates database 150, the advertising database 165, and the sites database 170. The database server 100 receives requests for information from computer terminals 110 and in response to such requests takes appropriate actions as will be discussed in detail hereinafter. These requests include performing string-based searches of the various databases (125, 165, 170) and viewing geographical regions stored in map database 145. As shown in FIG. 1, the control server 185 includes a time/location filter 190 for filtering search results, as will also be discussed in detail hereinafter.

In accordance with one aspect of the present invention, each computer terminal 110 includes a database handler 195, which is configured to transmit search queries to database server 100, as will be described in detail hereinafter. The database handler 195 is also configured to operate in accordance with the principles of a geographic interface system (GIS). To this end, database handler 195 receives information relating to geographic regions, which are retrieved from map database 145 and combines this information with predetermined information retrieved from directory database 125 and advertising database 165 to display an image of a geographic region together with directory or advertising information relating to an entity depicted on the image, as discussed in detail in application Ser. No. 08/824,106.

The operation of geographic interface systems (GIS) is well-known and described, for example, in: (1) *SAGE Introductory Guidebook*, Robert M. Itami and Robert J. Raulings, DISR (Melbourne, Australia, 1993); (2) *Principles of Geographical Information Systems for Land Resources Assessment*, Clarendon Press, Oxford University Press, (New York 1986); (3) *Geographic Information Systems: A management perspective*, Aronoff, Stanley WDL Publications, (Ottawa, Canada 1989); and (4) *Geographic Information Systems: An Introduction*, Star, Jeffrey, and Estes, John E. Prentice-Hall, Inc. (Englewood Cliffs, N.J. 1990). Commercially available geographic information systems may be obtained from Eliris, Inc., and Arc/Info, Inc.

Generally, database handler 195 is a computer program installed in each computer terminal 110. In accordance with one embodiment of the present invention, database handler 195 operates as a geographic information system (GIS). Database handler 195 is used for retrieving, analyzing, and displaying map data, corresponding to geographical maps, stored in map database 145 in conjunction with customer record data stored in customer directory database 125. To this end, the Earth's features are not only represented in pictorial form, as in conventional paper maps, but as information or data.

The data stored in map database 145 contains all the spatial information relating to conventional geographical maps. With the aid of a geographic information system (GIS), this spatial data is advantageously displayed, on computer terminal 110, just like a paper map with roads, rivers, vegetation and other features represented as lines on a map complete with legend, border and titles. At least one important feature of geographic information systems (GIS's) is that the information stored in map database 145 is stored in a structured format referred to as a spatial database. The way spatial data are structured allows the user to store, retrieve and analyze the information.

Figure 2A:
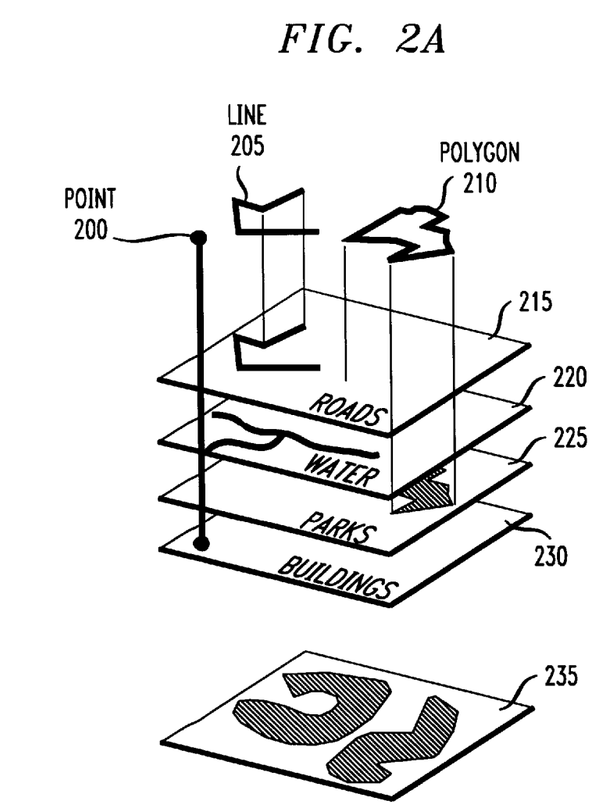
FIGS. 2A and 2B illustrate two embodiments of a data structure wherein spatial data in a map database are stored in accordance with the present invention.
Figure 2B:
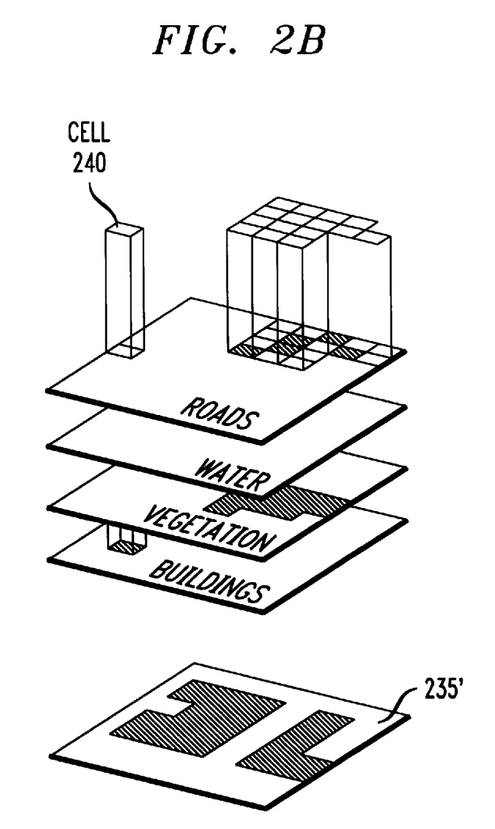

FIGS. 2A and 2B illustrate two examples of methods wherein spatial data in map database 145 is stored. FIG. 2A illustrates an example, where map features are stored in vector format. To this end, data is stored as a series of points, lines and polygons, such as points 200, lines 205, and polygons 210, with a substantially high degree of accuracy. In accordance with one embodiment of the invention, buildings are preferably represented as polygons or points having a given size corresponding to the actual size of the building. Roads and rivers are preferably represented by lines having given lengths and widths corresponding to their actual dimensions.

FIG. 2B illustrates another example, where map features are stored in raster or grid format. A matrix of cells 240 generalize the location of features on a map. Many geographic information systems may be configured to handle both vector and raster data from a wide variety of sources including satellite imagery, hand digitized maps and scanned images.

As illustrated in FIGS. 2A and 2B map information in map database 145 is represented thematically. A standard topographic map will show roads, rivers, parks, and building patterns and other features on a single map sheet. In a geographic information system (GIS) these features are categorized separately and stored in different map themes or overlays. For example, roads are preferably stored in a separate overlay 215. Likewise, rivers and streams are preferably stored in a separate overlay 220. Parks are stored in a separate overlay 225, and buildings are stored in a separate overlay 230. This way of organizing data makes maps much more flexible to use since these overlays or themes can be combined in any manner that is useful. Furthermore, updating map information may be accomplished more easily. As illustrated in FIG. 2b, information stored in raster format appears less realistic than that stored in vector format.

In accordance with one embodiment, each thematic overlay is advantageously separated in additional corresponding overlays, although the invention is not limited in scope in that respect. For example, overlay 215 corresponding to roads, may comprise many road overlays, with roads in each overlay categorized on a hierarchial basis. Preferably, interstate highways are stored in one overlay, and state highways in another overlay and local roads in still another overlay. Likewise, overlay 220, corresponding to parks, may comprise many park overlays, with parks in each overlay categorized on the basis of size. For example, large state parks may be stored in one overlay, and smaller city and neighborhood parks may be stored in another overlay. This overlay categorization allows the user to view each retrieved map with a predetermined degree of resolution. As more and more layers are combined, more detail appears on the map being displayed.

Figure 3:
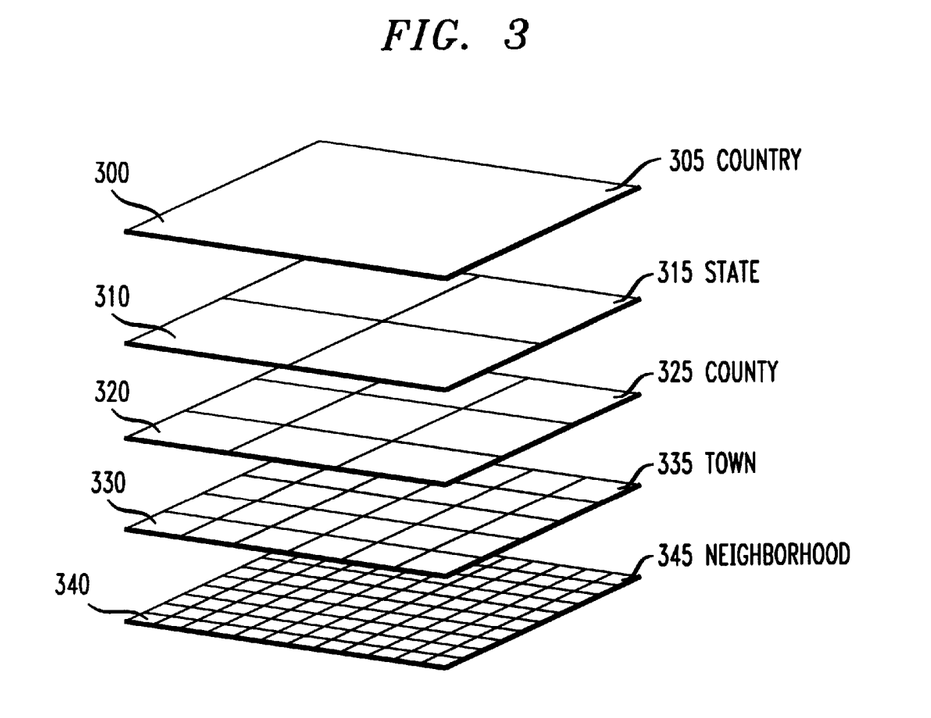
FIG. 3 illustrates an exemplary manner wherein geographical regions for display are categorized in accordance with one embodiment of the present invention.

In one embodiment, geographical regions available for display are also categorized into tiles and zoom layers as illustrated in FIG. 3, with each tile and zoom layer defined by a range of latitude and longitude coordinates. For example, various maps with different scales may be stored in map database 145. FIG. 3 represents an exemplary zoom layer system for a map database system having five zoom layers, with each zoom layer a factor of eight greater in scale than the more detailed zoom layer below it.

For example, zoom layer 305 includes a tile 300 that represents a portion of a general map of a country. Such a map, when displayed on computer terminal 110, illustrates gross details, such as state boundaries. Zoom layer 315 includes a plurality of tiles 310, each of which represent a map relating to one or more states corresponding to the area represented by tile 300. Each tile 310 when displayed on computer terminal 110, illustrates more details of areas contained in a state. Zoom layer 325 includes a plurality of tiles 320, each representing a map of a county corresponding to the area represented by tiles 310. Each tile 320, when displayed on computer terminal 110, illustrates more details of areas contained in a county. Zoom layer 335 includes a plurality of tiles 330, each representing a map of a town corresponding to the area represented by tiles 320. Each tile 330, when displayed on computer terminal 110, illustrates more details of areas contained in a town. Finally, zoom layer 345 includes a plurality of tiles 340, each representing a map of a neighborhood corresponding to the area represented by tiles 330. Each tile 340, when displayed on computer terminal 110, illustrates details of areas contained in a neighborhood, including buildings. FIGS. 2*a* illustrates an exemplary map tile 235 that is formed by combining thematic layers 215 through 230. It will be appreciated that any combination of thematic layers 215 through 230 may be employed to form a map tile 235.

Each zoom layer corresponds to a predetermined scale. Furthermore, each tile in each layer represents an actual length of a geographic region being represented in accordance with each zoom layer. Using this exemplary scaling system, each tile 340 of zoom layer 345 represents a square area with each side having an approximate length of 2000 feet. Likewise each tiles 330 of zoom layer 335 represents a square area with each side having an approximate length of 3 miles. Tiles 320 of zoom layer 335, each represent a square area with each side having an approximate length of 24 miles. Tiles 310 of zoom layer 315, each represent a square area with each side having an approximate length of 194 miles. Finally tile 300 of zoom layer 305 represents a square area with each side having an approximate length of 1550 square miles.

It is to be noted that a plurality of overlay maps such as 220 through 230 may correspond to each tile. Thus, the system allows each map region to be visualized at a predetermined scale, depending on the zoom layer from which a tile, or portion of a tile, is being displayed. It also allows the user to control the degree of detail that is included in each tile being displayed, depending on the number of thematic layers used in a combination of overlays to display the tile.

In addition to various themes or overlays 215 through 230 and zoom layers 305 through 345, map database 145 also stores the label information relating to each location. A label information may comprise a text string; location of the label on the map; its orientation and size.

In order to ensure that all images of maps stored in map database 145 overlay accurately, the data set is "georeferenced" to a common coordinate system. For example, Universal Transverse Mercator (UTM) projection is commonly used to define coordinates in the system. This technique is well-known and thus, is not discussed in detail herein.

Map database 145 represents an object-oriented database, in which each map record or map tile consists of a list of objects. Table -1- illustrates the data structure of an exemplary map tile, although the invention is not limited in scope in that respect.

TABLE 1

| | |
|---|---|
| Location | This is the reference location of the map tile identified with a unique map tile identifier. |
| Object List | This is a list of map objects, which in general represent entities which can logically carry a single label (whether or not they are labeled). Examples of objects are: overlays that include streets, building outlines, parks, bodies of water, etc.; Labels (text strings, location of labels, orientation, etc.); Polygons (a set of filled polygons, drawn in order); Ranges of latitude and longitude coordinates; Directory Reference (objects that include pointers to the directory database. These pointers may comprise a unique identifier number ("ID#") as discussed in detail in co-pending application Ser. No. 08/824,106.) |

Thus, personal computer terminal 110 may allow a user to retrieve and display images corresponding to map tiles or portions of map tiles from map database 145. Preferably, the user is able to zoom these images, starting at, for example, a very high altitude, where only gross details are visible, e.g., state boundaries, and gradually zoom into a given location until great detail is visible, such as building names, numbers and outlines. In response to a user's commands as discussed in more detail hereinafter, database handler 195 retrieves a selected map tile, and displays all the objects indicated in the corresponding object list of the map record. The user-interface of database handler 195 is described in more detail hereinafter with reference to FIGS. 4A–4D.

Figure 4A:
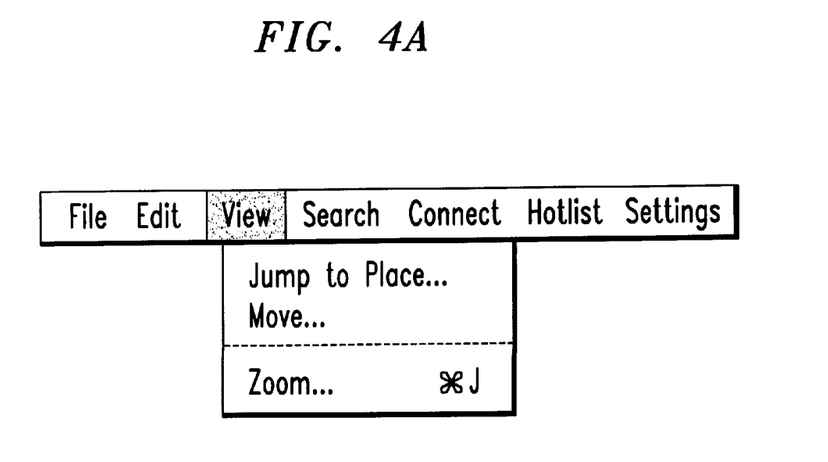
FIGS. 4A–4D illustrate the menu screens relating to a "view" function which are available to the user of a geographical information search system in accordance with one embodiment of the present invention.

FIG. 4A illustrates an example of a menu screen that is displayed in accordance with one embodiment of the invention. The menu advantageously includes several function categories comprising: File, Edit, View, Search, Connect, Hotlist, and Settings, although the present invention is not limited in scope in that respect. The user may select any one of these functions, in response to which the database handler 195 provides additional options available to the user.

The file, edit, connect, hotlist and settings features, although advantageous, refer to additional capabilities of the user interface through which searches are initiated in accordance with one embodiment of the present invention. The operation of the file, edit, connect, hotlist and settings features is discussed in detail in application Ser. No. 08/824, 106, which is incorporated herein by reference. Because the operation of these features is not essential to an understanding of the present invention, they are not discussed in detail herein. In contrast, the operation of the view and search functions is discussed in detail hereinafter.

FIGS. 4A–4D illustrate the menu options relating to the "view" function of data base handler 195. FIG. 4A illustrates an exemplary menu of features available when the "view" function is selected. In response to the selection of a viewing feature, database handler 195 sends a request to database server 100 to access and retrieve corresponding map tiles stored in map database 145.

Figure 4B:
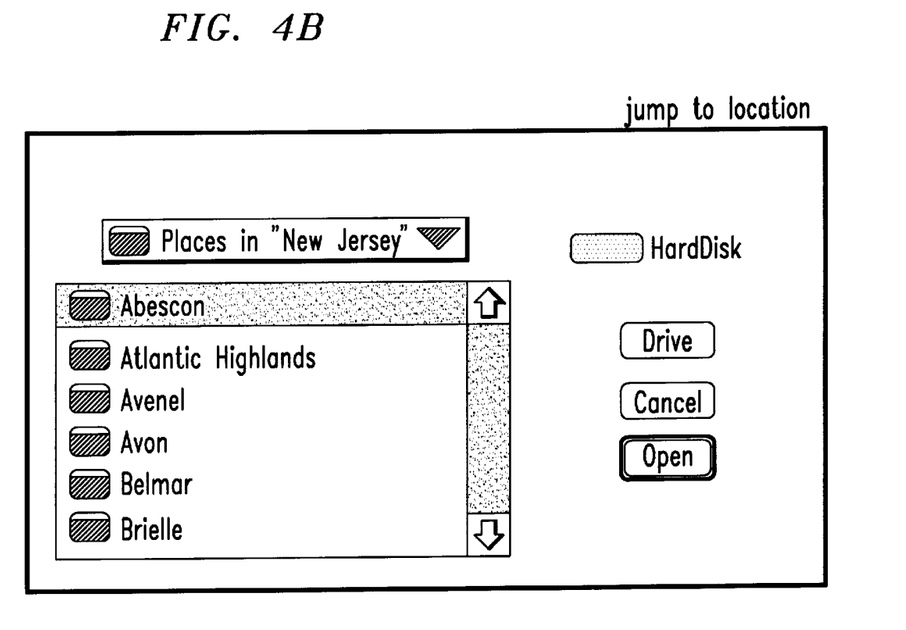

One of the features available under the "view" function is the "jump" to a location feature. In response to this request, database server 100 retrieves a list of all available map tiles in a hierarchial order. For example, the user may first browse the list of countries that map database 145 maintains a corresponding map tile therefor. In response, the user may select a desired country. Database server 100 then provides a list of map tiles that are associated with the desired country. These map tiles preferably relate to a list of states that map database 145 maintains. In response, the user may select a desired state. Database server 100 then provides a list of map tiles that are associated with the desired state. These map tiles preferably relate to a list of counties that map database 145 maintains. Database server 100 then provides a list of map tiles that are associated with the desired county. These map tiles preferably relate to a list of towns that map database 145 maintains. Finally, database server 100 provides a list of map tiles that are associated with the desired town. These map tiles preferably relate to a list of neighborhoods that map database 145 maintains.

At any time during the selection process explained above, the user may generate an "open" command to view a selected region. In response, database server 100 retrieves the map tiles associated with the selected region and transmits the map data to computer terminal 110. Database handler 195 receives the map data and displays the map tiles on the computer screen.

Figure 4C:
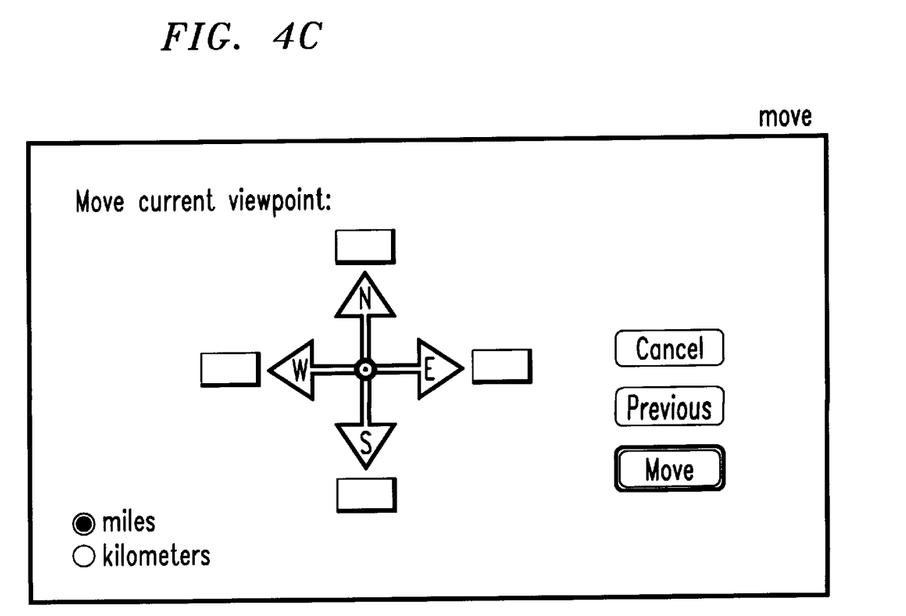

The next feature available under the "view" function is the move command, as illustrated in FIG. 4C. This feature allows the user to move the viewpoint currently displayed on the screen of computer terminal 110. In response to this command, database server 100 retrieves corresponding map tiles that are contiguous to the currently displayed map tile. Typically, the user defines the distance and the direction that the current viewpoint is desired to be moved. Based on this requirement all or a partial portion of contiguous map tiles may be retrieved and displayed.

Figure 4D:
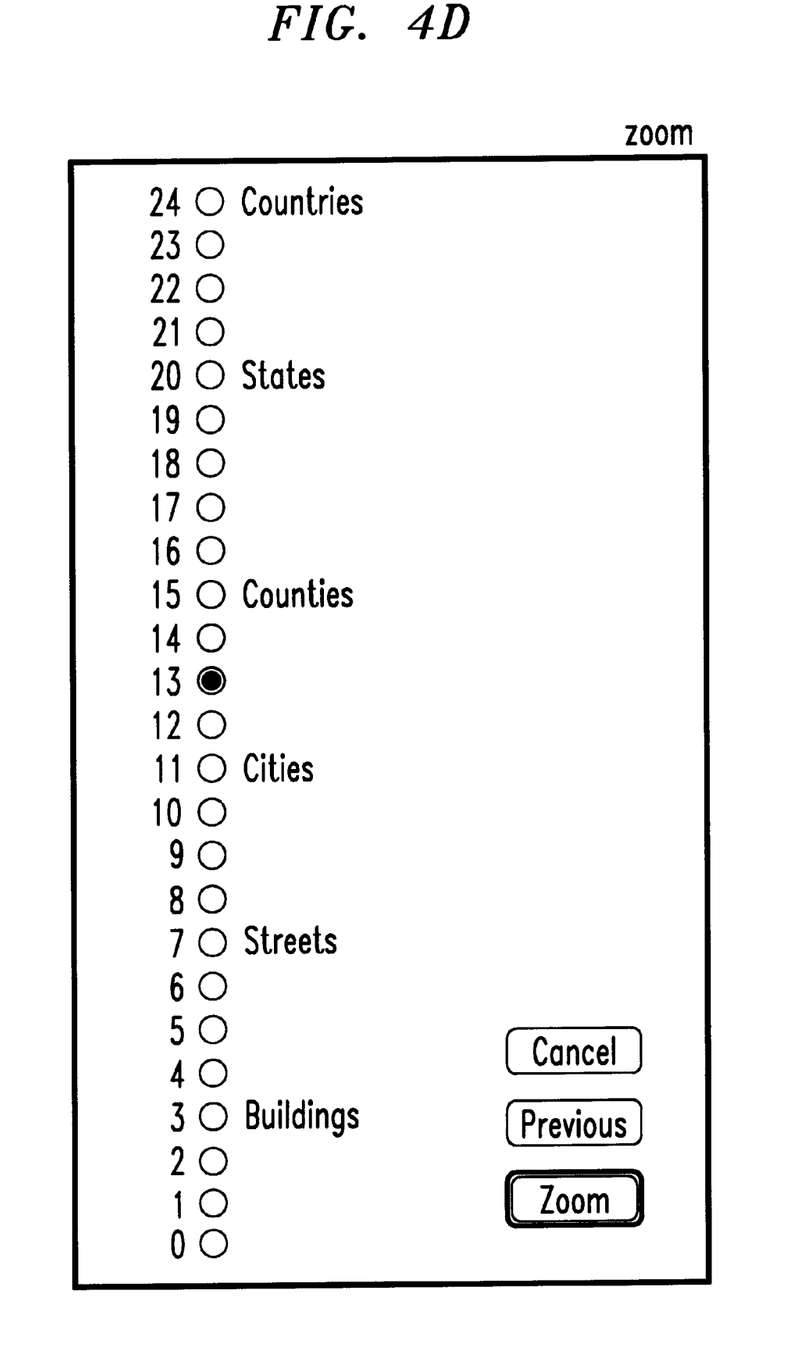

Another feature available under the "view" function is the zoom command, as illustrated in FIG. 4D. This feature allows the user to zoom or pan the viewpoint currently displayed on the screen of computer terminal 110. In response to this command, database server 100 retrieves corresponding map tiles with different degrees of resolution. Thus, the user may view a desired location contained within map tiles displayed on computer terminal 110. The user may then request a more detailed map of the currently displayed viewpoint. By selecting a desired zoom level database server 100 retrieves more detailed map tiles corresponding to the currently displayed viewpoint. By using the move and zoom features illustrated in FIGS. 4C and 4D, the user may retrieve map data with various scale factors relating to a displayed viewpoint.

Figure 5:
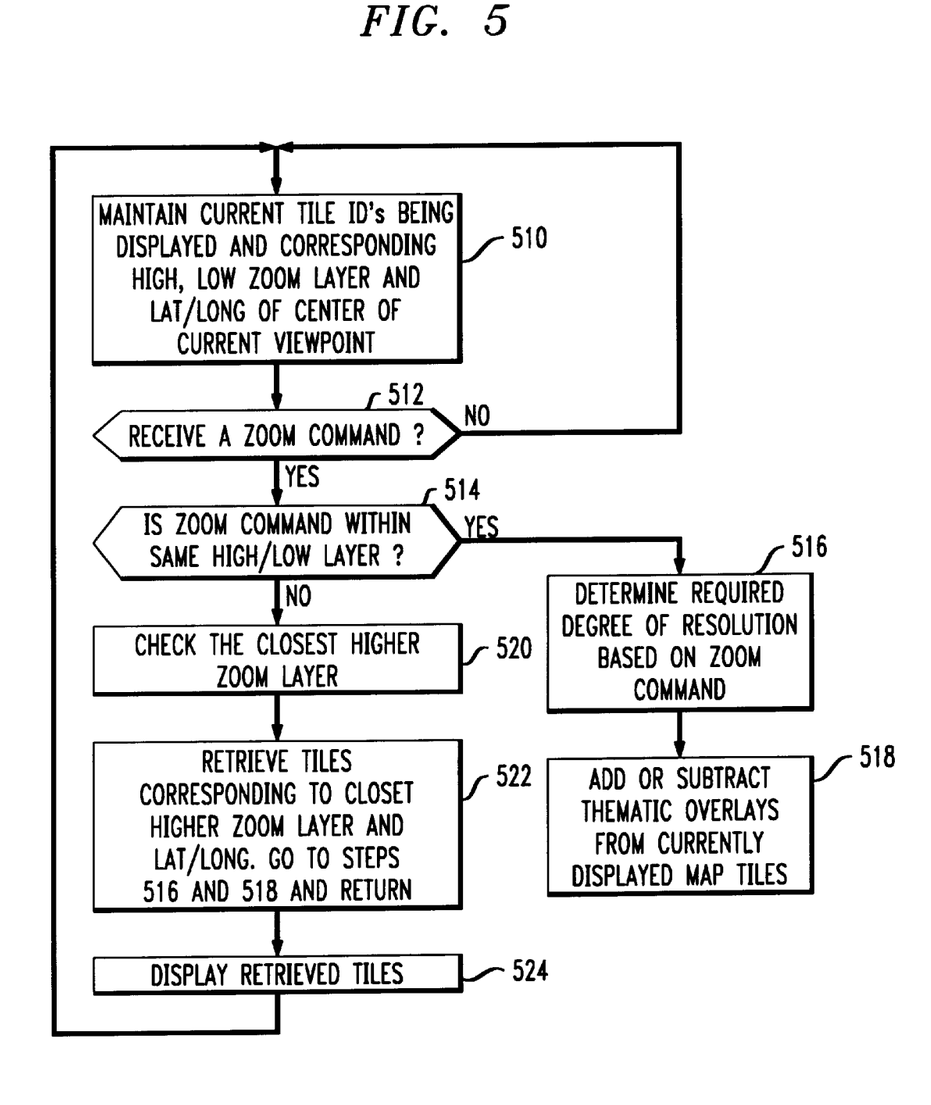
FIG. 5 is a flow chart illustrating the process for varying the zoom level of a map displayed on a terminal in accordance with one embodiment of the present invention.

The "zoom" function is described in more detail hereinafter, in reference with FIG. 5, which is a flow chart illustrating the process wherein various map tiles are displayed in accordance with a desired zoom layer. Database handler 195, at step 510, maintains the current tile identification numbers related to the map tiles that are being displayed. Database handler 195 also maintains two consecutive zoom layers, within which the current zoom level lies. At step 510, database handler 195 also obtains the latitude and longitude of the location that corresponds to the center of the currently displayed viewpoint.

The zoom levels illustrated in FIG. 4D correspond to the layers discussed in connection with FIG. 3, and advantageously comprise, country, state, county, town and neighborhood zoom layers. As illustrated, each zoom level is identified by a number, preferably ranging from "0" to "24", where "0" corresponds to map tiles with highest degree of resolution and "24" corresponds to map tiles with the lowest degree of resolution. Zoom level 7 coincides with zoom layer 345 of FIG. 3. Likewise, zoom level 11 coincides with zoom layer 335 of FIG. 3. Zoom level 15 coincides with zoom layer 325 of FIG. 3. Zoom level 20 coincides with zoom layer 315 of FIG. 3, and zoom level 24 coincides with zoom layer 305 of FIG. 3.

At step 512, database handler 195 determines whether a zoom level command has been generated. If not, the system goes back to step 510 and maintains the same information it had maintained before. If, however, at step 512 a new zoom level command has been generated, the system goes to step 514 to determine whether the new zoom level falls within the same two consecutive zoom layers that were maintained at step 512. If so, the system goes to step 516 to determine the degree of resolution required on the same map tiles being currently displayed, based on the zoom level command. If the zoom level command has been decreased, the system adds additional thematic overlays to the currently displayed map tiles, as discussed in connection with FIGS. 2A and 2B to increase the details being currently displayed. If the zoom level command has been increased, the system subtracts thematic overlays from the currently displayed map tiles, as discussed in connection with FIGS. 2A and 2B.

If at step 514, database handler 195 determines that the new zoom level command falls outside the two consecutive zoom layers that were maintained at step 510, the system goes to step 520 to obtain the next higher zoom layer. The system then goes to step 522 to retrieve map tiles corresponding to the obtained zoom layer and the latitude and longitude information maintained at step 510. The system then repeats steps 516 and 518 to obtain thematic overlays corresponding to an appropriate resolution. The system then goes to step 524 and displays the retrieved map tiles. Thereafter the system goes to step 510 and repeats the process described above.

Figure 6:
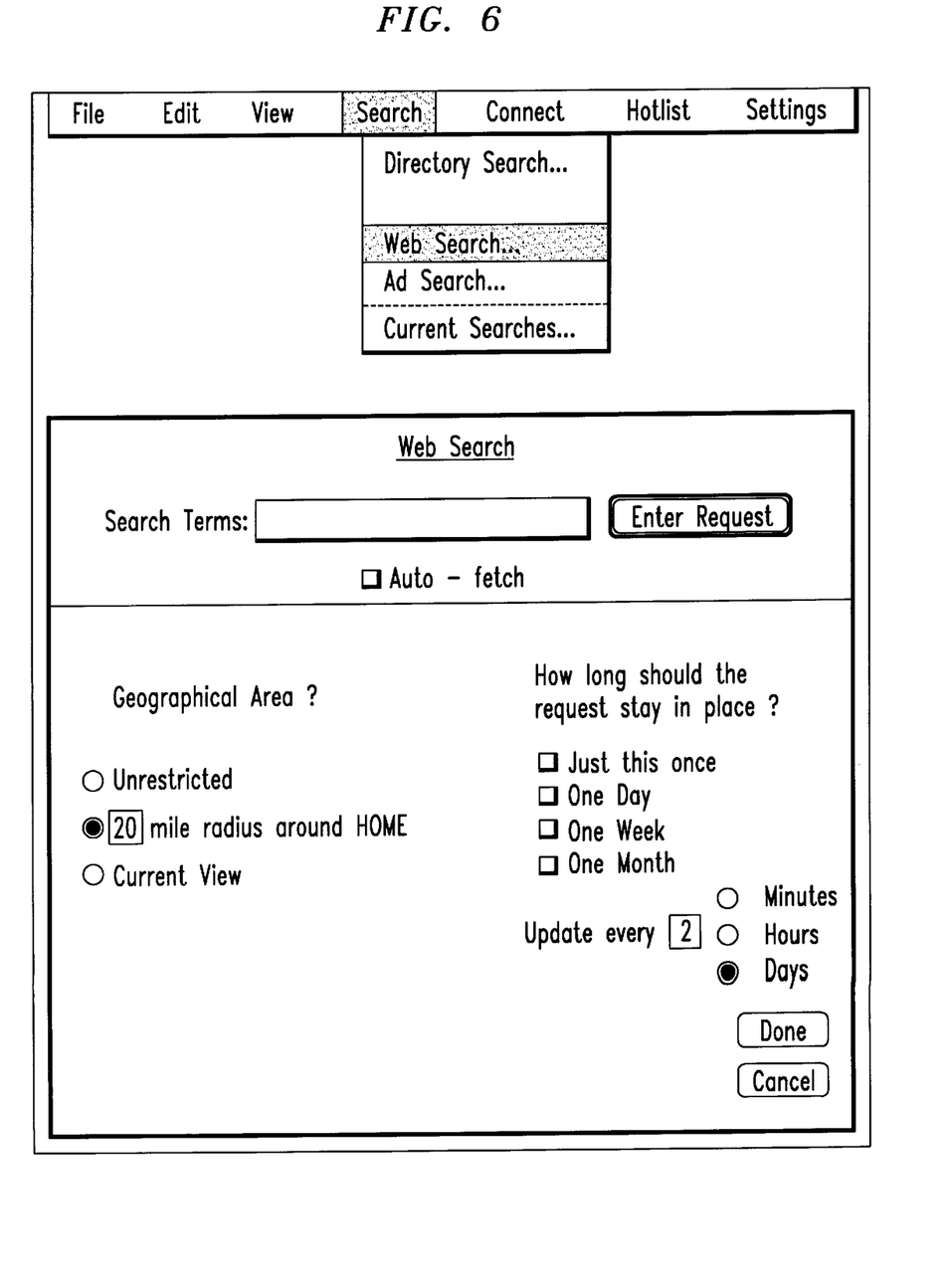
FIGS. 6 and 7 illustrate the menu screens relating to a "search" function which are available to the user of a geographical information search system in accordance with one embodiment of the present invention.

FIG. 6 illustrates the menu options available under the "search" function of database handler 195. As illustrated in FIG. 6, these options comprise a directory search, a web search, and an ad search. Although the present invention will be described in detail in conjunction with the "web search" option, it is to be understood that the principles of the present invention are equally applicable in the case where a user selects the "directory search" or "ad search" options. The search function also includes a "current searches" option as will be discussed in detail hereinafter.

Selection of the "web search" option results in the display of the "web search" screen on the user's computer terminal 110. The user begins by entering search terms relevant to the information being sought.

As shown in FIG. 6, the database handler 195, in connection with the web search option, queries the user for the geographic area of the search. The user is provided with three choices: no limitation, a specified radial distance from the user's base location or "home", and the user's current view as retrieved in accordance with the viewing feature described above. The first choice available to the user is to conduct the search without any geographic limitations. With respect to the second choice available to the user, the "home" location is a user-specified default location which is stored in the database handler 195 along with other user preferences. The home location may be the location of the user's home or workplace. Moreover, the term "radial distance" is used loosely and may simply mean a square search area with the home location at its center.

Regarding the third choice available to the user, the "current view" refers to the geographic area corresponding to the map visible on the screen. As described above in connection with the viewing feature, the user is able to pan, zoom and jump to various locations, and thus, is able to precisely specify the geographical area of interest, defined in terms of a range of latitude and longitude coordinates.

As also shown in FIG. 6, the database handler 195, in connection with the web search function, further queries the user for the required duration of the search. The user is provided with four choices: "just this once", "one day", "one week" or "one month". The database handler 195 also queries the user for the frequency of search updates: "every x minutes", "every x hours", or "every x days", where x is specified by the user. Because search updates may consume user resources as well as network resources and may result in connection charges, the user may wish to limit the frequency of these updates. Thus, the database handler 195 provides the user with the option of making the search "persistent" by having the database handler 195 update the search results on a regular basis. In this regard, the database handler 195 operates as a background process using the date/time feature of the terminal's operating system to automatically send search queries to the database server 100 in accordance with the present invention. As such, the use of string-based queries together with the automatic re-querying of the particular data source, permits the user to customize searches and, in effect, to "subscribe" to information of a very specific type. As will be discussed, the present invention also permits the user to receive only the information that has been modified since the user last requested it.

With continuing reference to FIG. 6, the database handler 195, in connection with the web search function, provides the user with the choice of selecting an auto-fetch feature. If the auto-fetch feature is not selected, the search results received from database server 100 is a list of URL's and/or other header information. However, if the auto-fetch feature is selected, the content page of each URL is also received from database server 100.

Figure 7:
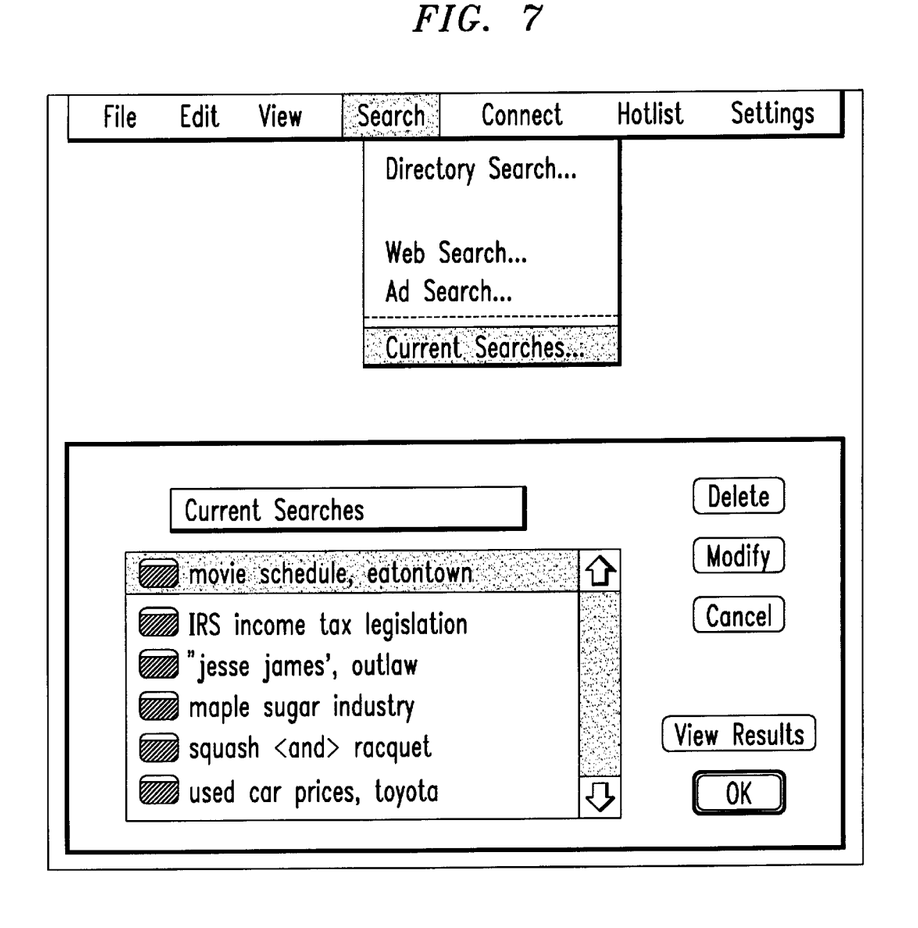

FIG. 7 illustrates the screen displayed on a user's terminal 110 in response to the selection of the "current searches" option of the search function. Current searches are listed in terms of the search strings entered by the user, as illustrated in FIG. 7. The user may first browse the list of current searches and select a search to delete, modify or view. The delete button on the screen inactivates a selected search and removes it from the list. The modify button opens the screen illustrated in FIG. 6 and thus, permits the user to redefine the search parameters for a search. These parameters include the search terms, the geographic limitations, the duration of the search, and the periodicity of search updates. The view results button will display for a search either the list of URL sites alone (if auto-fetch is inactive) or both the URL sites and their corresponding content pages (if auto-fetch is active).

Figure 8:
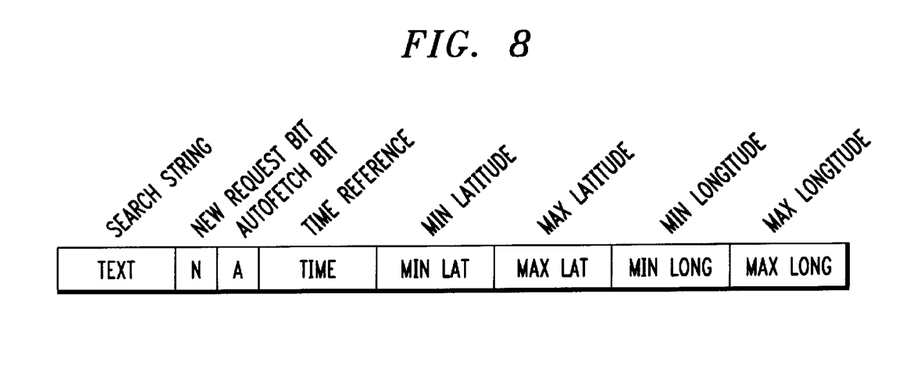
FIG. 8 illustrates the format of a search query in accordance with one embodiment of the present invention.

FIG. 8 illustrates an exemplary search query generated by the database handler 195. As shown in FIG. 8, the query format includes fields for a search string, a "new request" bit, an auto-fetch bit, a time reference, and a geographic reference. The geographic reference includes a minimum latitude (MINLAT), a maximum latitude (MAXLAT), a minimum longitude (MINLONG), and a maximum longitude (MAXLONG). The search string, the auto-fetch bit, and the geographic reference are specified by the user in accordance with the web search option of the search feature described above.

The new request bit and the time reference in the search query are specified by the database handler 195. The new request bit is set to "1" the first time a query is transmitted to the database server 100 and thereafter is set to "0" for any re-queries, such as in the case where a user has specified that the database handler 195 update a search periodically. The time reference is the date/time that the query was last transmitted to the database server 100; for new requests, this field would be empty.

The functionality of the time/location filter 190 (hereinafter "the filter") resident in the control server 185 will now be discussed in detail. For each search query, the control server 185, in connection with the web search function, searches the sites database 170 and generates a list of sites that satisfy the search string component of the query. Each site on the list preferably has both a time reference and a geographic reference associated therewith. The filter 190 then removes from the list irrelevant sites that do not satisfy the time reference and geographic reference parameters of the search query as will be discussed in detail hereinafter in connection with FIG. 9. Ultimately, the database server 100 transmits the filtered search results to the user's terminal 110, thereby conserving network resources and reducing the amount of filtering required of the user.

Figure 9:
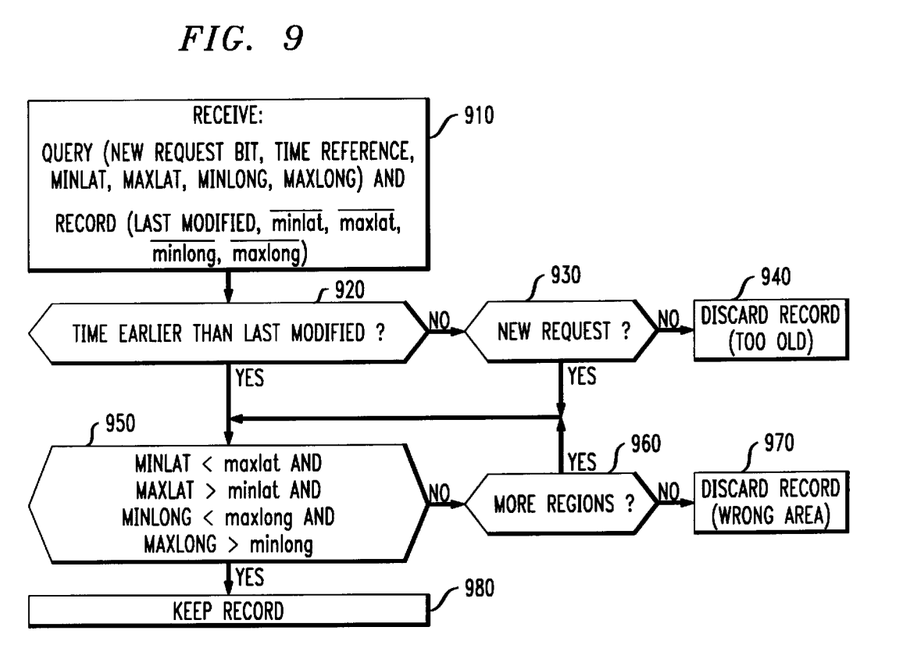
FIG. 9 is a flow chart illustrating the process for filtering records retrieved in response to a search query in accordance with one embodiment of the present invention.

FIG. 9 is a flow chart illustrating the process of filtering search results as performed by the time/location filter 190.

In step 910, the filter 190 receives a query transmitted by database handler 195 and a record retrieved from the sites database 170 in response to the query. As discussed above, the query contains a new request bit, a time reference (i.e., the date/time that the query was last transmitted to the database server 100), and a geographic reference, which includes a minimum latitude (MINLAT), a maximum latitude (MAXLAT), a minimum longitude (MINLONG), and a maximum longitude (MAXLONG). The record retrieved from the sites database 170 preferably includes entries for the date/time that the site was last modified and a geographic reference, which, like the geographic reference of the query, includes a minimum latitude (minlat), a maximum latitude (maxlat), a minimum longitude (minlong), and a maximum longitude (maxlong).

In step 920, the filter 190 compares the last time the query was transmitted to the database server 100 (TIME REFERENCE) against the last time the site was modified (LAST MODIFIED) to determine whether TIME REFERENCE is earlier than LAST MODIFIED.

As discussed above in connection with FIG. 1, the process of accumulating sites in the sites database 170 and time stamping them is done autonomously by the web crawler 175. When the web crawler 175 encounters a new site, a site record is generated and the entry in the LAST MODIFIED field of the record is the date/time that the record is stored in the sites database 170. When the web crawler 175 revisits a site, the web crawler 175 replaces the current entry in the LAST MODIFIED field of the site record with the "actual" last modified date of the site (e.g., the administrator of the site may have modified the contents thereof since the last time the web crawler 175 encountered it), provided that the actual last modified date is later than the current entry in the LAST MODIFIED field.

If it is determined in step 920 that TIME REFERENCE is later than LAST MODIFIED, the filter 190 determines in step 930 whether the new request bit in the query is set to "1". Recall that a new request bit set to "1" indicates that this is the first time that the query has been transmitted to the database server 100. If the new request bit is not set to "1", the filter 190 discards the record in step 940 as being too old.

However, if it is determined in step 920 that TIME REFERENCE is earlier than LAST MODIFIED or, if it is determined in step 930 that the new request bit is set to "1", the filter 190 proceeds in step 950 to compare the geographic reference of the query against the geographic reference of the site. In particular, the filter 190 in step 950 calculates whether:

MINLAT<maxlat;

MAXLAT>minlat;

MINLONG<maxlong; and

MAXLONG>minlong to determine whether some portion of the area defined by the geographic reference specified in the site record is within the area defined by the geographic reference specified in the query. In other words, the filter 190 determines whether the two areas overlap.

If the areas do not overlap, the filter 190 determines in step 960 whether there are any additional geographic references associated with the site record and, if there are, returns to step 950 to compare the area defined by the geographic reference of the query against the area defined by the additional geographic reference of the site. If the areas do not overlap and there are no additional geographic references associated with the site, the record is discarded in step 970 as not being within the user's geographic area of interest.

However, if it is determined in step 950 that an area defined by a geographic reference specified in the site record overlaps the area defined by the geographic reference specified in the query, the site information, such as the URL, corresponding to the site record is retained by the filter 190 and ultimately transmitted in step 980 to the database handler 195 that originated the query.

It is to be understood that complexities can arise in cases where a site encountered by the web crawler 175 does not maintain an "actual" last modified date or any geographic reference information. Absent this information, a site which satisfies the search string component of a user's search query will simply be provided to the database handler 195 and it will be up to the user to thereafter determine whether the site is temporally and geographically relevant to his search.

Thus, the filter 190 requires specific geographic reference information in terms of latitude and longitude ranges for comparison with the geographic reference parameters of the search query. However, there typically are several clues within a site, which provide some insight into the site's geographic reference, albeit without specifying latitude and longitude ranges. The filter 190 therefore performs the additional task of using these clues to determine the geographic reference of a site.

The extension on the URL is itself a clue as to a site's geographic reference. For example, a URL extension clearly indicates whether the site originates from a country outside the United States (e.g., a .JP extension refers to a site originating from Japan). Perhaps the biggest clue, however, comes from a "place name"(e.g., Monmouth, N.J.) in the header of a site's content page. As discussed above, filter 190 is coupled to a location/coordinates database 150 which stores information correlating place names to a range of coordinates defined in terms of latitude and longitude. Thus, filter 190 can obtain a geographic reference in terms of latitude and longitude ranges for comparison with the geographic reference parameters of the search query by accessing the location/coordinates database 150.

Figure 10:
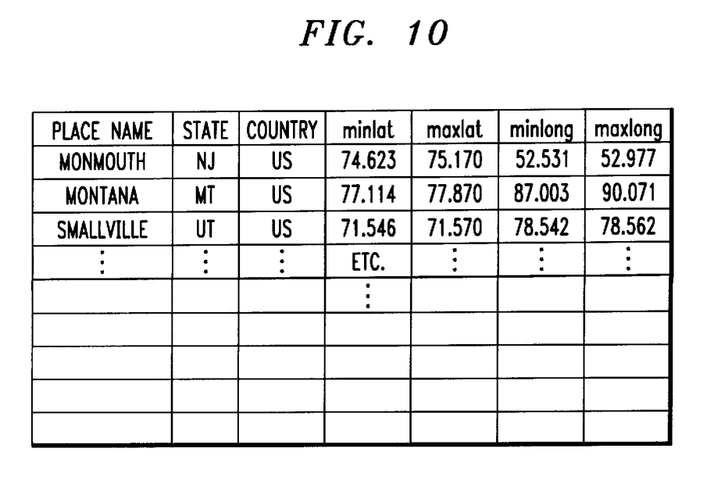
FIG. 10 illustrates the format of a database storing information that relates place names to geographical extents in accordance with one embodiment of the present invention.

FIG. 10 illustrates the format of the location/coordinates database 150. As shown in FIG. 10, the database contains records for each place name. Each record for each place name includes fields for the state, the country, the minimum latitude, the maximum latitude, the minimum longitude, and the maximum longitude, corresponding to the place name.

Thus, the present invention provides many advantages compared to traditional text string search systems. As an example, consider a text string search for the category "dry cleaners". Without geographic specification, the thousands of "hits" returned make this type of search nearly meaningless. Even if the name of a single locality is included in the text string in an attempt to reduce the number of "hits", a complete search should include the names of all neighboring localities as well. As one can imagine, the process can become quite unwieldy. In contrast, in accordance with one embodiment of the present invention, specifying a location is not a text-oriented process, but more precisely involves a comparison of geographical coordinates. Moreover, the cumbersome process of specifying geographical coordinates is eased by the use of the maps by the database handler 195.

In accordance with an alternate embodiment of the present invention, the ability to make a search persist such that only new information is automatically retrieved is a powerful capability that serves to further reduce the amount of time spent by a user filtering search results.

Moreover, the ability to combine these search features introduces many possibilities, which may significantly increase the utility of the on-line information systems. The consequences for the local economy are extremely important, as users, in accordance with the present invention, can now operate in an on-line context which is much more local than the entire on-line world. For example, a classic car buff can enter a persistent search for a "1965 Mustang" in the hope of finding one for sale. The search could be active for a year or two and cover several counties, until a day such a car is offered for sale. The search does its work automatically and unobtrusively, and brings tremendous value to the user once a car is located.

The database handler 195 also allows the system to emulate an information "push" system, in which information is delivered to the user without the need to constantly search for it. However, because the system begins with a search string, essentially infinite customization is possible depending upon the specificity of the search string.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

For example, it is to be understood that the present invention is applicable to searches of any data source including, but not limited to, the directory database 125, the advertising database 165, and the sites database 170 of FIG. 1, provided that the search queries and the information being searched are qualified by time and/or geographic references, as discussed in detail above. Indeed, a localized database such as advertising database 165 can be more closely regulated than a widely distributed data source such as the internet and thus, the information therein invariably qualified by time and/or geographic references in accordance with the present invention.

We claim:

1. A method for a server to enable a user of a user terminal to search a data source accessible by the server, comprising the steps of:

receiving, from the user terminal, a submission of a search query including a text string component specified by the user and a related first time reference indicating a time of a last prior submission of the search query by the user terminal to the server to search the data source;

using, at the server, the text string component of the search query to search records in the data source;

comparing, at the server, the first time reference against a second time reference relating to a record in the data source that satisfies the text string component of the search query to determine whether to transmit the record to the user, wherein the second time reference indicates a time when the record was last modified in the data source; and transmitting the record from the server to the user terminal if the step of comparing determines that the record was modified in the data source after the last prior submission of the search query by the user terminal to the server.

2. An information search system for enabling a user of a user terminal to search a data source, comprising:

a data source having stored therein a plurality of records;

a server in communication with the data source, the server configured to receive, from the user terminal, a submission of a search query including a text string component specified by the user and a related first time reference indicating a time of a last prior submission of the search query by the user terminal to the server to search the data source;

use the text string component of the search query to search records in the data source;

compare the first time reference against a second time reference relating to a record in the data source that satisfies the text string component of the search query to determine whether to transmit the record to the user, wherein the second time reference indicates a time when the record was last modified in the data source; and transmit the record to the user terminal if the comparison step determines that the record was modified in the data source after the last prior submission of the search query by the user terminal to the server.

\* \* \* \* \*